United States Patent
Bigo et al.

(10) Patent No.: US 6,239,893 B1
(45) Date of Patent: May 29, 2001

(54) VERY HIGH DATA RATE SOLITON REGENERATOR

(75) Inventors: Sébastien Bigo, Palaiseau; Gilles Vendrome, Sceaux, both of (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/002,913

(22) Filed: Jan. 5, 1998

(30) Foreign Application Priority Data

Jan. 6, 1997 (FR) .................................................. 97 00044

(51) Int. Cl.[7] .......................... H04B 10/02; H04B 10/20; H04B 10/16; H04B 10/00; H04J 14/02
(52) U.S. Cl. .......................... 359/176; 359/119; 359/127; 359/179; 359/158
(58) Field of Search .................................... 359/115, 116, 359/122, 127, 119, 117, 156, 188, 176, 179; 385/15, 16

(56) References Cited

U.S. PATENT DOCUMENTS

| | | | |
|---|---|---|---|
| 4,810,052 | * 3/1989 | Fling | 350/96.16 |
| 5,473,712 | * 12/1995 | Blow et al. | 385/16 |
| 5,500,908 | * 3/1996 | Liedenbaum et al. | 385/5 |
| 5,548,433 | * 8/1996 | Smith | 359/158 |
| 5,625,479 | * 4/1997 | Suzuki et al. | 359/135 |
| 5,760,948 | * 6/1998 | Bigo et al. | 359/326 |
| 5,857,040 | * 1/1999 | Bigo et al. | 385/15 |

FOREIGN PATENT DOCUMENTS

0718992A1 6/1996 (EP) .

OTHER PUBLICATIONS

S. Bigo et al, Dual–Control Nonlinear–Optical Loop Mirrors for All–Optical Soitoin Synchronous Modulation, *Optics Letters*, vol. 21, No. 18, Sep. 15, 1996, pp. 1463–1465.
M. Nakazawa et al, "60GIBT/S WDM (20 GBIT/S x3 Unequally Spaced Channels) Soliton Transmission Over 10000KM Using In–line Synchronoius Modulation and Optical Filtering", *Electronics Letters*, vol. 32, No. 18, Aug. 29, 1996.

* cited by examiner

*Primary Examiner*—Jason Chan
*Assistant Examiner*—M. R. Sedighian
(74) *Attorney, Agent, or Firm*—Sughrue, Mion, Zinn, Macpeak & Seas, PLLC

(57) ABSTRACT

The invention provides a regenerator for very high rate solitons, the regenerator comprising a non-linear loop mirror or NOLM receiving the soliton signal and modulating it with a control signal. The regenerator also comprises a device for generating the control signal by beats between two light sources, with the frequency of at least one of the two sources being variable and servo-controlled as a function of the modulated soliton signal, e.g. as a function of its power, or servo-controlled by means of an optical phase-lock loop. This provides a soliton regenerator in which the electronic components operate at low frequency only, while being capable of regenerating a soliton signal at a very high rate.

21 Claims, 2 Drawing Sheets

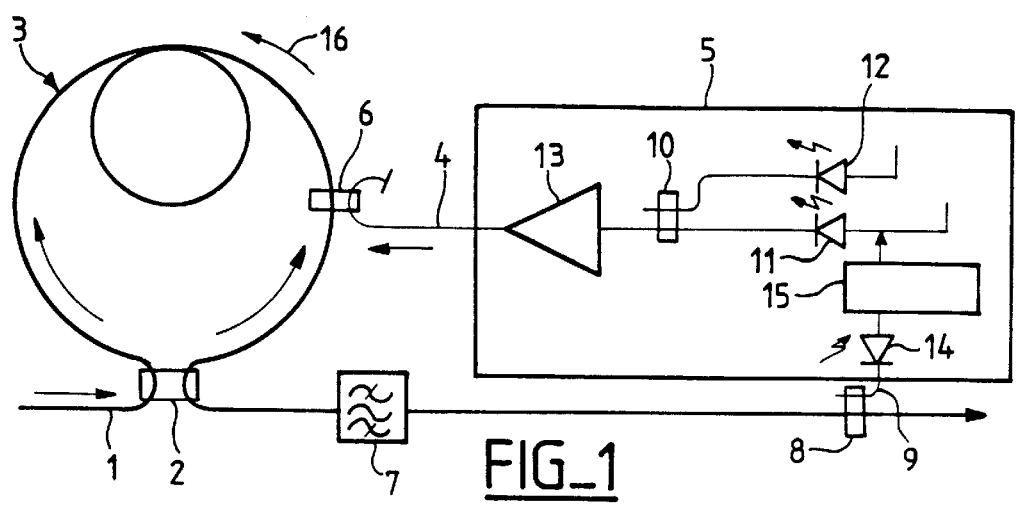
FIG_1
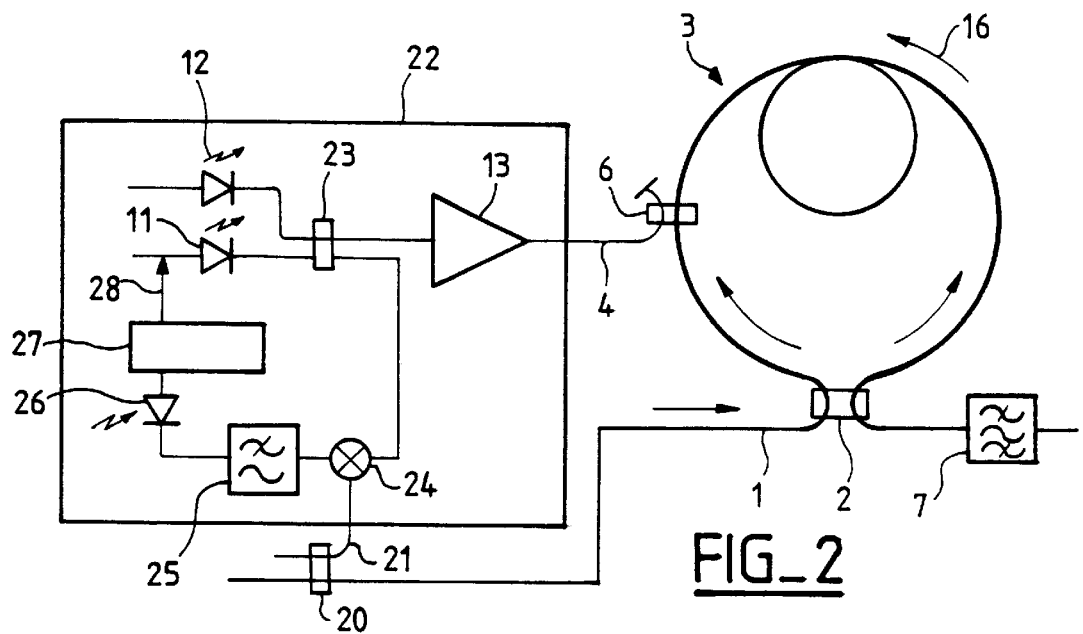
FIG_2
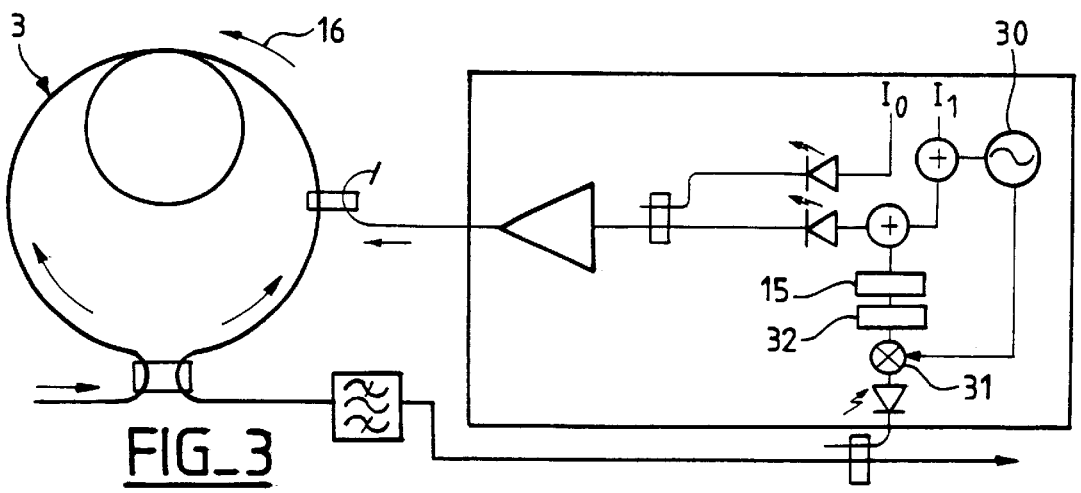
FIG_3

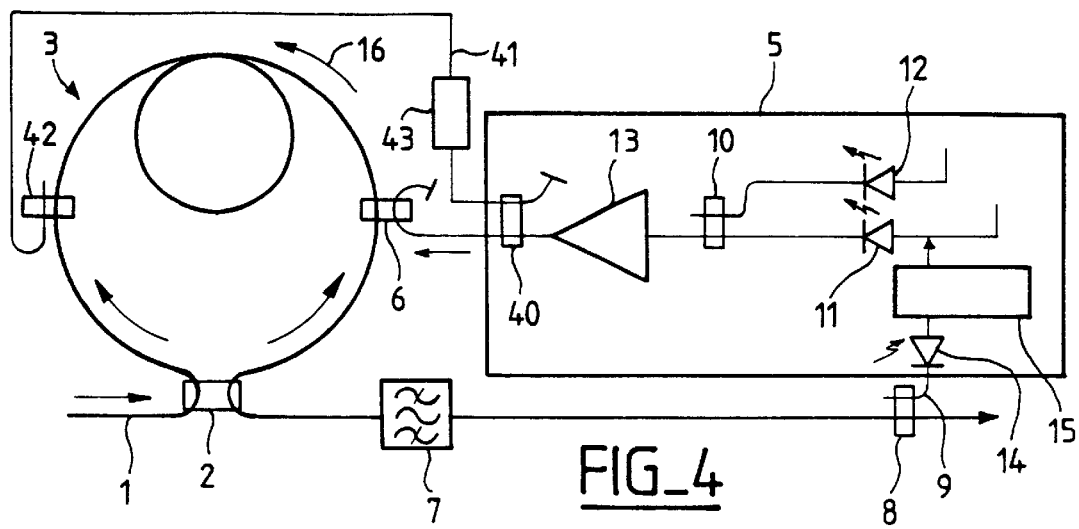
FIG_4
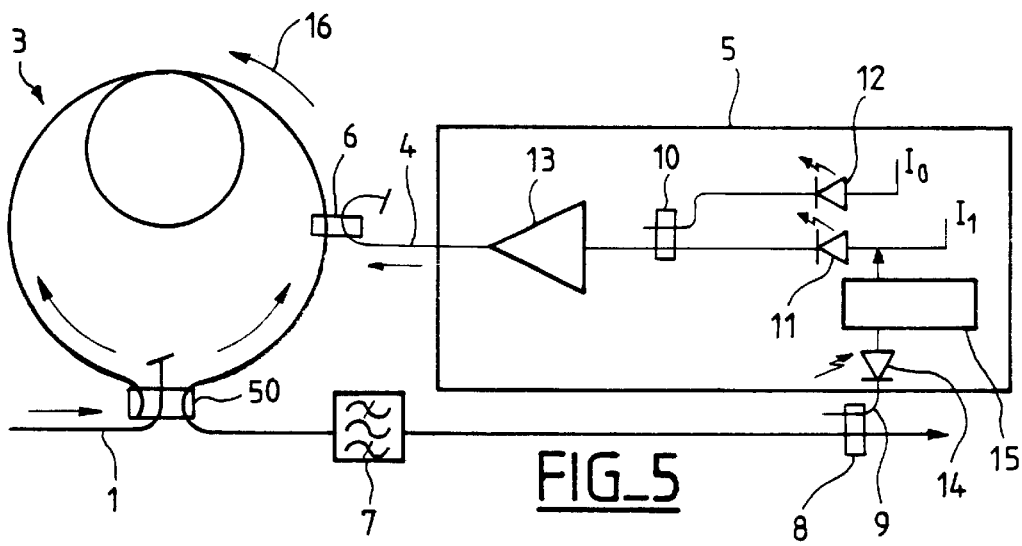
FIG_5
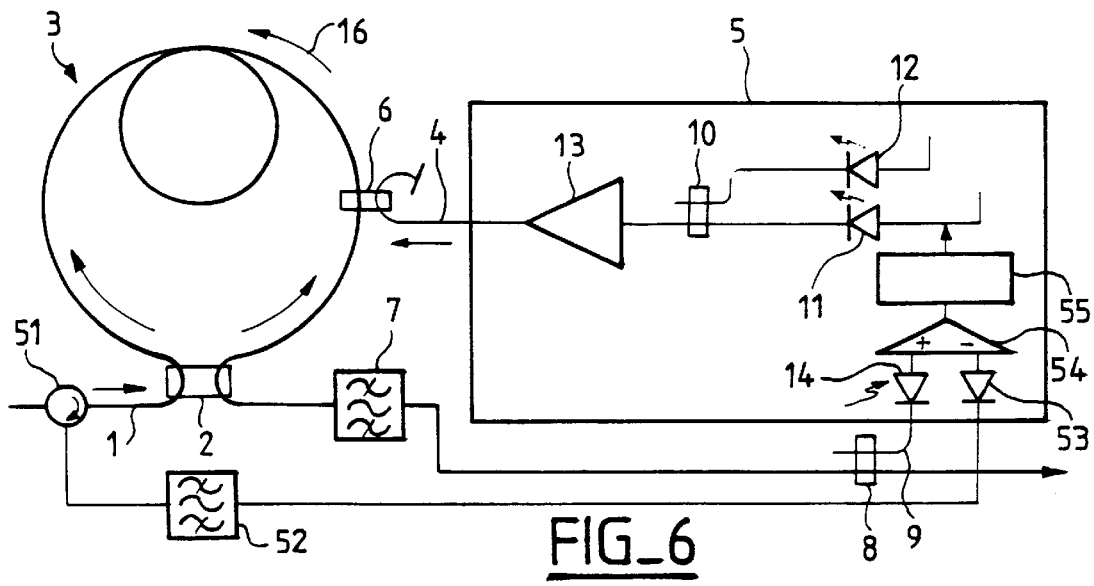
FIG_6

VERY HIGH DATA RATE SOLITON REGENERATOR

The present invention relates to a very high data rate soliton regenerator, and to a method of regenerating solitons at a very high data rate.

BRIEF DESCRIPTION OF THE DRAWINGS

The transmission of soliton pulses or solitons of hyperbolic secant envelope, in the portion of an optical fiber having abnormal dispersion is a known phenomenon. The transmission of so-called "black" solitons, constituted by pulse gaps in a continuous signal, in the portion of an optical fiber having normal dispersion is also known; in this case the solitons are of a wavelength such that they propagate with negative chromatic dispersion. Both with "white" solitons and with "black" solitons, the non-linearity in the corresponding portion of the fiber used to compensate dispersion of the optical signal. Soliton transmission is modelled in known manner using the non-linear Schrodinger equation.

Various effects limit the transmission of such pulses, such as the jitter imparted by interaction between solitons and the noise present in the transmission system, as described for example in the article by J. P. Gordon and H. A. Haus, published in Optical Letters, vol. 11, No. 10, pages 665–667. This effect, which is known as the "Gordon-Haus" effect, puts a theoretical limit on the quality or on the rate at which soliton transmission can take place.

Because of the deformation imparted to solitons by transmission, and in particular because of the jitter imparted by the Gordon-Haus effect, considerable efforts are required to ensure that a signal encoded by solitons is conveyed successfully by a transmission system. One of the satisfactory solutions, and perhaps the only solution, for ensuring successful transmission over virtually infinite distances consists in ensuring synchronous modulation of the solitons. This requires both that the solitons be modulated and, in order to synchronize the modulator, that the soliton data frequency be recovered. Those two functions, modulation and clock recovery, must operate at the soliton data frequency, which means that all-optical solutions are particularly useful, i.e. solutions that are controlled optically. In particular, in order to provide alloptical modulation of the soliton signal, it is necessary to produce or to recover an optical sinewave at the corresponding frequency.

Various systems have also been proposed to produce an optical sinewave at the bit frequency. Conventional electro-optical means, such as a directly modulated laser diode, or using external modulation by means of a MachZehnder interferometer, require high frequency electronic components to be used, thereby increasing the cost of devices, and limiting the maximum frequency to about 40 Gbit/s.

For microwave transmission systems, and for the purpose of reducing the phase noise of semiconductor lasers, an article by U. Gliese et al., published in IEEE Photonic Technology Letters, Vol. 4, No. 8, proposes using an optical phase-lock loop (OPLL) to generate microwave signals in the range 3 GHz–18 GHz. The beat signal between two laser sources, one of which is servo-controlled, is compared with the reference microwave oscillator signal. The phase difference signal that results therefrom is used for controlling the power supply current to the servo-controlled laser source. This ensures that the beat signal is locked onto the reference oscillator, in spite of laser phase noise.

An article by H. Bülow, published in IEEE Electronics Letters, Vol. 31, No. 22, describes a principle of optoelectronic synchronization for an optical demultiplexer. A signal demultiplexed at a sub-harmonic frequency is extracted from a multiplexed microwave signal by using a non-linear loop mirror (NOLM) as a switch at the rate of the sub-harmonic frequency. The article proposes using optoelectronic conversion and an electronic phase-lock loop to acquire and track the demultiplexed signal. One of the objectives of that article is to avoid using a fast phase detector such as that described in the article by Gliese et al.

An article by K. L. Hall et al., published in IEEE Photonics Technology Letters, Vol. 7, No. 8, describes an electro-optical phase-lock loop using a non-linear loop mirror as an all-optical comparator of bit phase. A reference source is presented at the input to the NOLM. A voltage-controlled laser source is coupled in the NOLM. Power measured at the outlet from the NOLM is compared with a reference voltage to control the voltage of the controlled source.

OBJECTS AND SUMMARY OF THE INVENTION

The present invention proposes an original and simple solution to the problem of regenerating solitons by synchronous modulation. It makes it possible to use electronic components of low frequency only even with transmissions having a potential of several hundreds of Gbit/s. In addition, the components of the invention are suitable for being submerged and can therefore be used without difficulty in transoceanic transmission systems.

More precisely, the invention proposes a soliton signal regenerator comprising a non-linear optical loop mirror receiving the soliton signal and modulating it with a control signal, and a device for generating the control by beats between two optical light sources in which the frequency of at least one of the two sources is variable.

It is possible to provide means for servo-controlling the variable frequency of at least one of the two sources as a function of the mean power of the modulated soliton signal.

It is also possible to provide means for servo-controlling the variable frequency of at least one of the two sources as a function of the difference between the mean powers of the modulated soliton signals as transmitted and as reflected by the non-linear optical loop mirror.

Finally, it is possible to servo-control the variable frequency of at least one of the two sources by an optical phase-lock loop for locking the beat signal from the two light sources on the soliton signal.

It is also possible to add to all those systems a source at a frequency that is small compared with the data frequency of the soliton signal, the signal from the source being included in the control signal, and synchronous detection means.

For this purpose, the regenerator preferably comprises a mixer for mixing the signal from the source with the signal corresponding to the mean power of the modulated soliton signal or to the mean power difference, and a filter for performing lowpass filtering on the mixed signal.

Advantageously, both light sources are laser sources, with the frequency of at least one of the two sources being servo-controlled by controlling its reference temperature or power supply current.

The frequency of the control signal may be equal to half the bit frequency of the soliton signal. It is also possible to provide for the non-linear loop mirror to have a three-inlet inlet coupler, and for the frequency of the control signal to be equal to the bit frequency of the soliton signal.

The non-linear loop mirror may have a medium that is highly non-linear, such as a chalcogenide fiber or a fiber whose core is doped with germanium.

In an embodiment, the device for generating the control signal supplies two control signals in phase opposition, which are coupled into the mirror at positions that are symmetrical relative to the inlet coupler of the mirror.

The invention also provides a method of regenerating a high rate soliton signal by synchronous modulation in a non-linear loop mirror, by generating the control signal by beating two light sources, the frequency of at least one of the two sources being variable.

The variable frequency of at least one of the two sources is servo-controlled as a function of the mean power of the modulated soliton signal, or as a function of the difference between the mean powers of the modulated soliton signals respectively transmitted and reflected by the non-linear loop mirror, or indeed by an optical phase-lock loop for locking the beat signal from the two light sources onto the soliton signal.

It is possible for a signal of low frequency compared with the data frequency of the soliton signal to be injected into the control signal, and for synchronous detection to be performed.

The two light sources may be laser sources, and the frequency of at least one of the two sources may be servo-controlled by controlling its reference temperature or its power supply current.

Preferably, the frequency of the control signal is equal to half the bit frequency of the soliton signal. It is also possible to provide for the non-linear loop mirror to have a three-inlet inlet coupler, the frequency of the control signal being equal to the bit frequency of the soliton signal.

Advantageously, the non-linear loop mirror has a medium that is highly non-linear, such as a chalcogenide fiber or a fiber whose core is doped with germanium.

It is possible for two control signals to be coupled in phase opposition into the mirror at positions that are symmetrical relative to an inlet coupler of the mirror.

BRIEF DESCRIPTION OF THE DRAWINGS

Other characteristics and advantages of the invention appear on reading the following description of embodiments of the invention, given by way of example and with reference to the accompanying drawings, in which:

FIG. 1 is a block diagram of a regenerator of the invention;

FIG. 2 is a block diagram of a second embodiment of a regenerator of the invention;

FIG. 3 is a diagram of a portion of a third embodiment of a regenerator of the invention;

FIG. 4 is a block diagram of a fourth embodiment of a regenerator of the invention;

FIG. 5 is a block diagram of a fifth embodiment of a regenerator of the invention; and FIG. 6 is a block diagram of a sixth embodiment of a regenerator of the invention.

MORE DETAILED DESCRIPTION

FIG. 1 is a block diagram of a regenerator of the invention. The FIG. 1 regenerator 1 receives a soliton signal at a bit frequency $f_0$ on a fiber 1 and serves to regenerate the signal by synchronous modulation. The signal is transmitted to the inlet optical coupler 2 of an optical fiber non-linear optical mirror "NOLM" 3. The coupler 2 has a coupling ratio $\eta/1-\eta$. The soliton signal is coupled in the NOLM 3 and is separated into two signals propagating in opposite directions, as indicated by the arrows, it is recombined in the coupler 2, and is reflected at the outlet of the coupler 2.

The NOLM modulates the soliton signal with a control optical signal, coming via a fiber 4 from a control signal generator device 5. The control signal is injected into the NOLM by a coupler 6 in the direction indicated by arrow 16. For further details on the operation of a NOLM as a modulator, reference may advantageously be made to the article by S. Bigo et al., published in IEEE Electronics Letters, Vol. 31, No. 2, pages 2191–2193, or to the article by S. Bigo et al., published in Optics Letters, Vol. 21, No. 18, pages 1463–1465.

Typically, the length of the NOLM is about 10 km, and the control signal is a sinewave at a frequency $f_0/2$, at a power of about 100 mW. As explained above, in such a device, one of the problems consists in obtaining an appropriate control signal.

For that purpose, in the embodiments shown in FIGS. 1 and 3 to 6, the invention proposes using the NOLM both for its modulator properties and for its optical phase comparator properties. The NOLM then locks the phase of the control signal on the soliton signal. The frequency of the control signal is locked onto the bit frequency or half said frequency simply by measuring the mean power of the soliton signal as modulated by the NOLM, and using an appropriate negative feedback loop.

Downstream from the coupler 2, the regenerator of FIG. 1 has a bandpass filter 7 which serves firstly to filter out the control signal and noise outside the soliton channel(s), and secondly to correct for amplitude instabilities imparted to the soliton train by the modulation.

Downstream from the filter 7, the regenerator has a coupler 8 typically having a coupling ratio of a few percent, e.g. a 10/90 coupler, which couples the fiber 1 with a length of fiber 9 that is connected to the control signal generator device 5.

To generate the control signal, the device 5 makes use of the beats between two continuous laser sources presenting frequencies that differ by the frequency $f_0/2$ of the solition signal. The device 5 thus has a two-inlet optical combiner 10 which receives the signals supplied by the two laser sources 11 and 12. The outlet from the combiner 10 delivers the beat signal from the two laser sources to an amplifier 13, e.g. an optical amplifier using an erbium-doped fiber. The outlet from the amplifier 13 is connected to the fiber 4 such that the amplified beat signal is delivered to the coupler 6 to serve as the modulation signal in the NOLM.

To generate an appropriate modulation signal, the frequency of one of the two laser sources 11 and 12 is servo-controlled; by way of example, it is possible to control the frequency of the laser source(s) by controlling its power supply current or its reference temperature. In the circuit shown in FIG. 1, the laser source 11 is controlled by means of its power supply current. The source 12 is thus powered at constant current $I_0$. The current $I_1$ powering the laser source 11 is servo-controlled as a function of the mean power of the modulated soliton signal as measured by a low frequency detector 14 on the fiber 9, e.g. a simple diode. The low frequency electric signal delivered at the output of the detector 14, also referred to as the "error" signal, is transmitted to an electronic control circuit 15 which controls the magnitude of the current $I_1$ powering the laser source 11. This constitutes an optical phase-lock loop which controls the current powering the laser source 11. In this loop, the NOLM is used as an optical phase comparator.

The regenerator of FIG. 1 operates as follows. The soliton signal reaching the NOLM 3 is modulated by the control signal delivered by the device 5. The modulated soliton signal leaving the NOLM is filtered by the filter 7 and a portion thereof is taken by the coupler 8 for controlling the device 5 which generates the control signal. The regenerator performs synchronous modulation on the received soliton signal without requiring any high frequency electronic components. In order to control the device 5, it suffices to know the mean power of the modulated soliton signal, which mean power is at a maximum when the modulation window is properly centered on the received solitons. Phase and frequency timing of the regenerator is at an optimum when the mean power of the modulated soliton signal is at a maximum.

The system operates in satisfactory manner when the response time of the phase-lock loop is less than the characteristic time of instabilities in the control signal generator device 5. The response time of the phase-lock loop depends essentially on the latency time of the NOLM, i.e. on the length of the fiber from which it is made. The characteristic time of instabilities in the device 5 depends on the width of the spectrum lines generated by the laser sources used. In the above-mentioned case of a NOLM that is about 10 km long, it suffices to use laser sources having a line width of the order of 100 kHz in order to ensure that the regenerator operates properly. Under such circumstances, the latency time of the NOLM is of the order of 50μs, and the product of said latency time multiplied by the laser line width is less than 5, which is sufficient for ensuring locking.

FIG. 2 is a block diagram of a second embodiment of the invention in which the frequency of one of the laser sources is servo-controlled by means of an optical phase-lock loop (OPLL). Instead of the elements 8, 9, and 5 of FIG. 1, the device of FIG. 2 has the following elements. Downstream from the NOLM, a coupler 20 couples the fiber 1 to a length of fiber 21. The signal from the fiber 21, taken from the soliton signal that is to be modulated, is applied to a signal regenerator device 22. Like the device 5 in FIG. 5, this device comprises two laser sources 11 and 12 similar to the sources in FIG. 1. The second source 11 is servo-controlled, e.g. by means of its power supply current. Its outlet optical signal has a frequency that differs by $f_0/2$ relative to the signal from the source 12. The outlet signals from the sources 11 and 12 are delivered to a two-inlet optical combiner 23. As in FIG. 1, one of the outlets from the combiner 23 is applied to an amplifier 13. The outlet from the amplifier 13 is connected to the fiber 4 so that the amplified beat signal is supplied to the coupler 6 to serve as a modulation signal in the NOLM. The other outlet from the combiner 23 is connected to an optical phase comparator 24. By way of example, it is possible to compare optical phase by means of crossed-gain modulation, mixing four waves in a semiconductor amplifier, mixing four waves in a fiber, or a NOLM. The optical phase comparator 24 also receives a reference signal having a component $f_0$; this signal comes from the fiber 21 and is simply derived from the soliton signal by means of the coupler 20. The outlet signal from the optical phase comparator 24 is delivered to a loop lowpass filter 25 whose outlet is delivered to a low frequency diode 26. The electric signal from the diode 26 controls electronics 27 for controlling the power supply current to the source 11. This controls the optical frequency of the source 11, as symbolized by arrow 28. The assembly comprising the combiner 23, the optical phase comparator 24, the loop lowpass filter 25, the diode 26, and the electronics 27 constitutes an optical phase-lock loop.

Where necessary, instead of taking the beat signal from the outlet of the combiner 23, it can equally well be taken downstream from the amplifier 13. The filter 25 is not essential insofar as the low frequency diode 26 can act as a lowpass filter.

Compared with the circuit of FIG. 1, the circuit of FIG. 2 improves the quality of the error signal transmitted to the electronics for controlling the current $I_1$ and improves operation of the regenerator. In the FIG. 2 circuit, no use is made of the phase comparator properties of the NOLM, with phase comparison in the phase-lock loop being provided by the optical phase comparator 24.

FIG. 3 is a block diagram of a third embodiment of a regenerator of the invention. Compared with the circuit of FIG. 1, the FIG. 3 circuit has the following differences. A source 30 at a frequency f that is small compared with the bit frequency $f_0$ is added into the current $I_1$. Also, between the low frequency detector 14 and the control electronics 15, there is inserted a mixer 31 and a lowpass filter 32. The mixer also receives a signal from the source 30.

The FIG. 3 regenerator operates in a manner substantially analogous to the FIG. 1 regenerator. However, the optical signal emitted by the laser source 11 also has a component at the frequency f. Providing the frequency f is very small compared with the bit frequency $f_0$ of the solitons, that is not troublesome. The mixer 31 mixes the low frequency signal delivered by the detector 14 with the signal at frequency f. The filter 32 eliminates noise from the signal supplied by the mixer, thereby improving the quality of the error signal applied to the control electronics 15. This improves operation of the regenerator.

The synchronous detection principle described with referenced to FIG. 3 can also be applied to the device of FIG. 2, mutatis mutandis.

FIG. 4 is a block diagram of a fourth embodiment of a regenerator of the invention. Compared with the FIG. 1 regenerator, the regenerator of FIG. 4 has the following differences: downstream from the amplifier 13 there is disposed a coupler 40 having a 50/50 coupling ratio, coupling a control signal into a fiber 41, which control signal is constituted by half of the outlet signal from the amplifier. The control signal coupled into the fiber 41 is coupled into the NOLM by means of a coupler 42 which is symmetrical to the coupler 6, and it propagates in the opposite direction to the control signal which is coupled into the NOLM via the coupler 6. In addition, means are provided for ensuring that the two control signals coupled into the NOLM by the couplers 6 and 42 are in phase opposition: for this purpose, it is possible to provide an appropriate difference in fiber length between the couplers 40 and 6 and between the couplers 40 and 42. It is also possible to provide an optical delay line 43 in the fiber between the couplers 40 and 6, or between the couplers 40 and 42.

The FIG. 4 regenerator operates in analogous manner to that of FIG. 1, with the exception of how the NOLM operates. For further details on the operation of the NOLM in the FIG. 4 configuration, reference may be made to the article by S. Bigo et al., published in Optics Letters, Vol. 21, No. 18, pages 1463–1465. The FIG. 4 regenerator makes it possible to avoid the phase effects imparted by the NOLM and which can be troublesome in some cases for soliton propagation. In the field expression for the signal modulated by the NOLM, there is a phase term which is a complex exponential of the half-sum of the phases of the signals propagating in the NOLM in both directions; the sum of these phases is zero providing provision is made for the two control signals to be in phase opposition.

As before, the regenerator of FIG. 4 can also make use of the elements described with reference to FIGS. 2 and 3.

FIG. 5 is a block diagram of a fifth embodiment of a regenerator of the invention. Compared with the regenerator of FIG. 1, the FIG. 5 regenerator has the following differences: the inlet coupler 50 of the NOLM is a 3/3 coupler instead of being a 2/2 coupler like the coupler 2 in FIG. 2. The soliton signal to be modulated arrives on the middle inlet of the coupler 50. The loop of the NOLM is connected to the first and third outlets of the coupler and the modulated signal is transmitted via the third inlet of the coupler. In the circuit of FIG. 5, use is made of a frequency difference of $f_0$ between the two laser sources, thus providing a control signal at the soliton bit frequency. The operation of a NOLM in such a circuit is described, for example, in a communication by D. Sandel et al., published in Optical Fibers Communications 1994, FG2, page 310.

The device of FIG. 5 operates on identical principles to that of FIG. 1, with the exception that the intensity modulation imparted by the NOLM is at the frequency of the control signal and not at twice the frequency of the control signal.

As before, it is possible also to make use of the elements of FIGS. 2, 3, and 4 in a regenerator of the type shown in FIG. 5.

FIG. 6 is a block diagram of a regenerator constituting a sixth embodiment of the invention. Compared with the embodiment of FIG. 1, the FIG. 6 regenerator has the following differences: upstream from the NOLM there is provided a circulator 51 which takes the signal reflected by the NOLM and applies it to a filter 52 analogous to the filter 7 of FIG. 1. The outlet signal from the filter 52 is applied to a low frequency detector 53 analogous to the detector 14 of FIG. 1. The low frequency electric signals delivered by the detectors 14 and 53 are compared by a comparator 54, and the error signal output by the comparator 54 is applied to control electronics 55 which controls the current $I_1$ powering the laser source 11.

The regenerator of FIG. 6 operates in analogous manner to the regenerator of FIG. 1. In the FIG. 1 regenerator, the error signal from the low frequency detector 14 must be maximized. In the FIG. 6 circuit, the error signal corresponds to the difference between the signals that are respectively reflected and transmitted by the NOLM, and it thus presents a sign. This makes it possible in the control electronics 55 to determine the direction in which the current $I_1$ needs to be varied, as a function of the value of the error signal, which is not the case for the control electronics 15 in FIG. 1. The FIG. 6 circuit thus makes it possible to simplify power supply current control.

To improve the operation of the FIG. 6 device, the output power of the control signal(s) is adapted so as to ensure, as far as possible, that the powers respectively transmitted and reflected by the NOLM are substantially equal. For this purpose, it is possible to operate at a control signal power which is equal to half the control signal power required for causing the NOLM to perform ON/OFF switching.

In the circuit of FIG. 6, it is possible also to use the solutions described with reference to FIGS. 3, 4, and 5. Clearly in FIG. 5, the circulator would need to be connected to the middle inlet of the 3/3 coupler.

Naturally, the present invention is not limited to the examples and embodiments described and shown, but can be varied in numerous ways.

Thus, in FIGS. 1 to 4 and 6, the simplest case is shown where the NOLM control signal is at a frequency of $f_0/2$. Clearly, it would also be possible to use a signal of frequency $f_0$, in which case a soliton would then be modulated in the NOLM only on every other half-cycle of the control signal. That would not alter the circuits shown in the figures apart from altering the frequencies of the laser sources.

The regenerator of FIG. 1, and the regenerator shown in the other figures, has a fiber NOLM as its modulator. Any other type of NOLM could be used as the modulator, i.e. any Sagnac interferometer including a non-linear medium. The interferometer may comprise a fiber or some other non-linear medium.

Thus, it would be possible to use a NOLM constituted by a fiber having non-linearity that is more marked, such as a chalcogenide fiber or a fiber whose core is doped with germanium. Compared with the regenerator of FIG. 1, such a fiber with non-linearity that is more marked enables the length of the loop of the NOLM to be reduced. The use of a chalcogenide fiber would make it possible to reduce said length by a factor of about 100, while the use of a fiber having its core doped with germanium would enable said length to be reduced by a factor of about 10.

Such a reduction in length reduces the latency time in the NOLM. This reduces the constraint on the quality of the device for generating the control signal for the NOLM: with smaller latency times, it is possible to use a control signal generator device having greater characteristic time instability. For a regenerator of the type shown in FIG. 1, this means that it is possible to use lasers of broader line width. For a NOLM having a chalcogenide fiber with a length of bout 0.1 km, the resulting latency time is about 0.5 $\mu$s, so it is possible to use lines having a width of about 10 MHz. For a NOLM using a fiber whose core is doped with germanium, and whose length is about 1 km, the latency time is about 5 $\mu$s and the line width of the lasers may be about 1 MHz.

What is claimed is:

1. A soliton signal regenerator comprising a non-linear optical loop mirror receiving a soliton signal and modulating it with a control signal to produce a modulate solition signal, and a device for generating the control signal by beats between two optical light sources in which the frequency of at least one of the two sources is variable;

wherein said control signal is based on at least one of said soliton signal and said modulated soliton signal.

2. A regenerator according to claim 1, including means for servo-controlling the variable frequency of at least one of the two sources as a function of the mean power of the modulated soliton signal.

3. A regenerator according to claim 1, including means for servo-controlling the variable frequency of at least one of the two sources as a function of the difference between mean powers of the modulated soliton signals as transmitted and as reflected by the non-linear optical loop mirror.

4. A regenerator according to claim 1, wherein the variable frequency of at least one of the two sources is servo-controlled by an optical phase-lock loop for locking a beat signal from the two light sources on the soliton signal.

5. A regenerator according to claim 1, further including both a source at a frequency that is small compared with the data frequency of the soliton signal, the signal from the source being included in the control signal, and synchronous detection means.

6. A regenerator according to claim 5, including a mixer for mixing the signal from the source with the signal corresponding to the mean power of the modulated soliton signal or to the mean power difference, and a filter for performing lowpass filtering on the mixed signal.

7. A regenerator according to claim 1, wherein both light sources are laser sources, with the frequency of at least one of the two sources being servo-controlled by controlling its reference temperature or power supply current.

8. A regenerator according to claim 1, wherein the frequency of the control signal is equal to half the bit frequency of the soliton signal.

9. A regenerator according to claim 1, wherein the non-linear loop mirror has a three-inlet inlet coupler, and wherein the frequency of the control signal is equal to the bit frequency of the soliton signal.

10. A regenerator according to claim 1, wherein the non-linear loop mirror has a medium that is highly non-linear, and wherein said medium is a chalcogenide fiber or a fiber whose core is doped with germanium.

11. A regenerator according to claim 1, wherein the device for generating the control signal supplies two control signals in phase opposition, which are coupled into the mirror at positions that are symmetrical relative to an inlet coupler of the mirror.

12. A method of regenerating a high rate soliton signal by synchronous modulation in a non-linear oiptical loop mirror, by generating a control signal by beating two light sources, the frequency of at least one of the two sources being variable;

wherein said control signal is based on at least one of an input soliton signal and a modulated soliton signal.

13. A method according to claim 12, wherein the variable frequency of at least one of the two sources is servo-controlled as a function of the mean power of the modulated soliton signal.

14. A method according to claim 12, wherein the variable frequency of at least one of the two sources is servo-controlled as a function of the difference between mean powers of the modulated soliton signal respectively transmitted and reflected by the non-linear loop mirror.

15. A method according to claim 12, wherein the variable frequency of at least one of the two sources is servo-controlled by an optical phase-lock loop for locking a beat signal from the two light sources onto the soliton signal.

16. A method according to claim 12, in which a signal of low frequency compared with the data frequency of the soliton signal is injected into the control signal, and in which synchronous detection is performed.

17. A method according to claim 12, wherein the two light sources are laser sources, and wherein the frequency of at least one of the two sources is servo-controlled by controlling its reference temperature or its power supply current.

18. A method according to claim 12, wherein the frequency of the control signal is equal to half the bit frequency of the soliton signal.

19. A method according to claim 12, wherein the non-linear loop mirror has a three-inlet inlet coupler, the frequency of the control signal being equal to the bit frequency of the soliton signal.

20. A method according to claim 12, wherein the non-linear loop mirror has a medium that is highly non-linear, and wherein said medium is a chalcogenide fiber or a fiber whose core is doped with germanium.

21. A method according to claim 12, wherein two control signals are coupled in phase opposition into the mirror at positions that are symmetrical relative to an inlet coupler of the mirror.

* * * * *